United States Patent
Graber et al.

(10) Patent No.: US 7,058,967 B2
(45) Date of Patent: Jun. 6, 2006

(54) VIDEO DISTRIBUTION SYSTEM AND METHOD

(75) Inventors: Kenneth L. Graber, Apple Valley, MN (US); Dallas Dale Redlin, Rosemount, MN (US); David Gordon Hanson, Spring Lake Park, MN (US); Mark Alan Owen, Apple Valley, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 908 days.

(21) Appl. No.: 09/738,719

(22) Filed: Dec. 15, 2000

(65) Prior Publication Data

US 2002/0116722 A1    Aug. 22, 2002

(51) Int. Cl.
*H04N 7/173* (2006.01)
*H04N 7/18* (2006.01)
*H04N 9/47* (2006.01)
*G08N 29/00* (2006.01)
*G06F 11/00* (2006.01)

(52) U.S. Cl. .................. 725/108; 725/105; 725/107; 348/143; 348/149; 348/150; 348/159; 340/506; 340/507; 340/508; 340/509; 714/1; 714/2; 714/4

(58) Field of Classification Search ........ 725/135–153, 725/32–36, 107, 108; 348/143, 149, 150, 348/158–9, 385–396; 340/507; 714/1–57
See application file for complete search history.

(56) References Cited

U.S. PATENT DOCUMENTS

| 4,511,886 | A | * | 4/1985 | Rodriguez | 340/534 |
| 4,814,869 | A | * | 3/1989 | Oliver, Jr. | 348/159 |
| 5,287,186 | A | * | 2/1994 | Takamori | 348/705 |
| 5,583,796 | A | * | 12/1996 | Reese | 702/185 |
| 5,625,864 | A | * | 4/1997 | Budow et al. | 725/82 |
| 5,963,843 | A | * | 10/1999 | Sit et al. | 725/146 |
| 6,154,772 | A | * | 11/2000 | Dunn et al. | 725/114 |
| 6,441,857 | B1 | * | 8/2002 | Wicker et al. | 348/441 |
| 6,449,768 | B1 | * | 9/2002 | Oftedahl et al. | 725/119 |
| 6,791,601 | B1 | * | 9/2004 | Chang et al. | 348/65 |

* cited by examiner

*Primary Examiner*—John Miller
*Assistant Examiner*—Michael R Shannon (57) ABSTRACT

An integrated video distribution system for distributing video signals from a plurality of sources. The system includes a digitizer arrangement arranged to receive analog video signals from a plurality of video sources. The analog video signals are digitized in YCrCb video format and converted to streams of digital video data. The video data is multiplexed and transmitted on a digital video bus having a plurality of video channels. In one embodiment, the digitizers and video bus are integrated with a backplane arrangement that includes expansion slots for a plurality of terminal controllers. The expansion slots provide connections to the video bus. Each terminal controller mounted on the backplane arrangement can be coupled to a display terminal and an input device. The terminal controller selects one or more of the input streams of video data in response to control signals from the input device and converts the selected video data to an analog video signal for output to a display terminal.

30 Claims, 6 Drawing Sheets

VIDEO DISTRIBUTION SYSTEM AND METHOD

RELATED PATENTS/APPLICATIONS

The present application is related to the patent application having Ser. No. 09/738,099, entitled, "MULTI-MODE VIDEO PROCESSOR" by Meddaugh et al., filed concurrent herewith on Dec. 15, 2000 and which is incorporated herein by reference.

FIELD OF THE INVENTION

The present invention generally relates to the distribution of video signals from multiple sources. More particularly, the invention relates to an integrated and modular video signal distribution and control system.

BACKGROUND

With the arrival of digital video technology and economical hardware, new applications are conceived and deployed with increasing regularity. Digitizing video signals enables remote and selective monitoring of one or more video signals, and economical hardware increases the range of problems for which the technology is suitable for applications.

Some digital video applications involve multiple personnel monitoring selected ones of a number of video signals. In these applications, the number of personnel is usually less than the number of video signals, processor-based control allows concurrent display of one or more video signals at a display terminal, and each person monitors and controls the display at one or more display terminals. For example, 4 people may be assigned the task of monitoring the video signals from a dozen or more sources, wherein each person can select for display at a display terminal one or more of the video signals. It will be appreciated that such systems have use in security, military, aviation, traffic, environmental and many other applications.

The particular requirements related to weight limits, modularity, and fail-safe operations present many challenges for designers of video distribution system. For example in a distributed architecture, workstations with powerful hardware and complex software may perform functions related to digitizing video signals and controlling the distribution and display of the video data. The distributed architecture may be excessive in terms of cabling if weight is a consideration and may be unduly complicated if modularity is a consideration. Another challenge involves adapting custom designed video distribution systems and applications to use commercial off the shelf (COTS) parts versus custom designed parts. Many manufacturers prefer to manufacture high volume parts and charge a premium to provide low volume, custom parts. To further complicate the situation for system designers, the output pin resources provided by COTS parts are also reduced at a time when system users are demanding that the video distribution system support more video channels. A system and a method that addresses the aforementioned problems, as well as other related problems, are therefore desirable.

SUMMARY OF THE INVENTION

The present invention is an integrated video distribution system for distributing video signals from a plurality of sources. In one embodiment, the system includes a digitizer arrangement arranged and configured to receive analog video signals from a plurality of video sources. The analog video signals are digitized to YCrCb format, multiplexed and converted to streams of digital video data that are transmitted on a digital video bus having a plurality of video channels. In one embodiment, the digitizers and video bus are integrated with a backplane arrangement that includes expansion slots for a plurality of terminal controllers. The expansion slots provide connections to the video bus. Each terminal controller mounted on the backplane arrangement can be coupled to a display terminal and an input device. The terminal controller selects one or more of the input streams of video data in response to control signals from the input device and converts the selected video data to an analog video signal for output to a display terminal. This arrangement provides a compact, yet modular and expandable video distribution system.

In another embodiment, a fail-safe video subsystem is coupled to the output ports of the terminal controllers. The fail-safe video subsystem has additional input ports for one or more video signals from alternative video sources. When power is applied to the fail-safe video subsystem, the input video signals are selectable for output, and when power is not applied, the video signals from the alternative sources are output.

It will be appreciated that various other embodiments are set forth in the Detailed Description and claims that follow.

BRIEF DESCRIPTION OF THE DRAWINGS

Various aspects and advantages of the invention will become apparent upon review of the following detailed description and upon reference to the drawings in which.

DETAILED DESCRIPTION

In various embodiments, a video distribution and control system and method are provided in which video signals from analog and digital sources are input to a digitizer arrange ment. The digitizer arrangement digitizes the analog video signals into video data, formats the video data for compatibility with a standard video bus, and multiplexes the video signals over the video bus. The video bus is integrated with a backplane arrangement, which has slots available for a plurality of terminal controllers. Each of the terminal controllers is associated with a display terminal and an input device, and video data from the video bus are selectively converted to an analog video signal for the display terminal responsive to control signals from the input device. The centralized digitizer arrangement, which is integrated with the backplane, supports modular expansion for adding display terminals and also reduces cabling. In one embodiment, the backplane and associated terminal controllers are contained and mounted within a single cabinet that is suitable for electronic equipment. A single power supply powers the arrangement. This arrangement provides a compact, yet modular and expandable video distribution system.

In another embodiment, video signals from fail-safe sources are input to the system. The fail-safe sources comply with selected fail-safe criteria, and the fail-safe video signals are made available at the display terminals, even if the digitizer and distribution arrangement fails.

Figure 1:
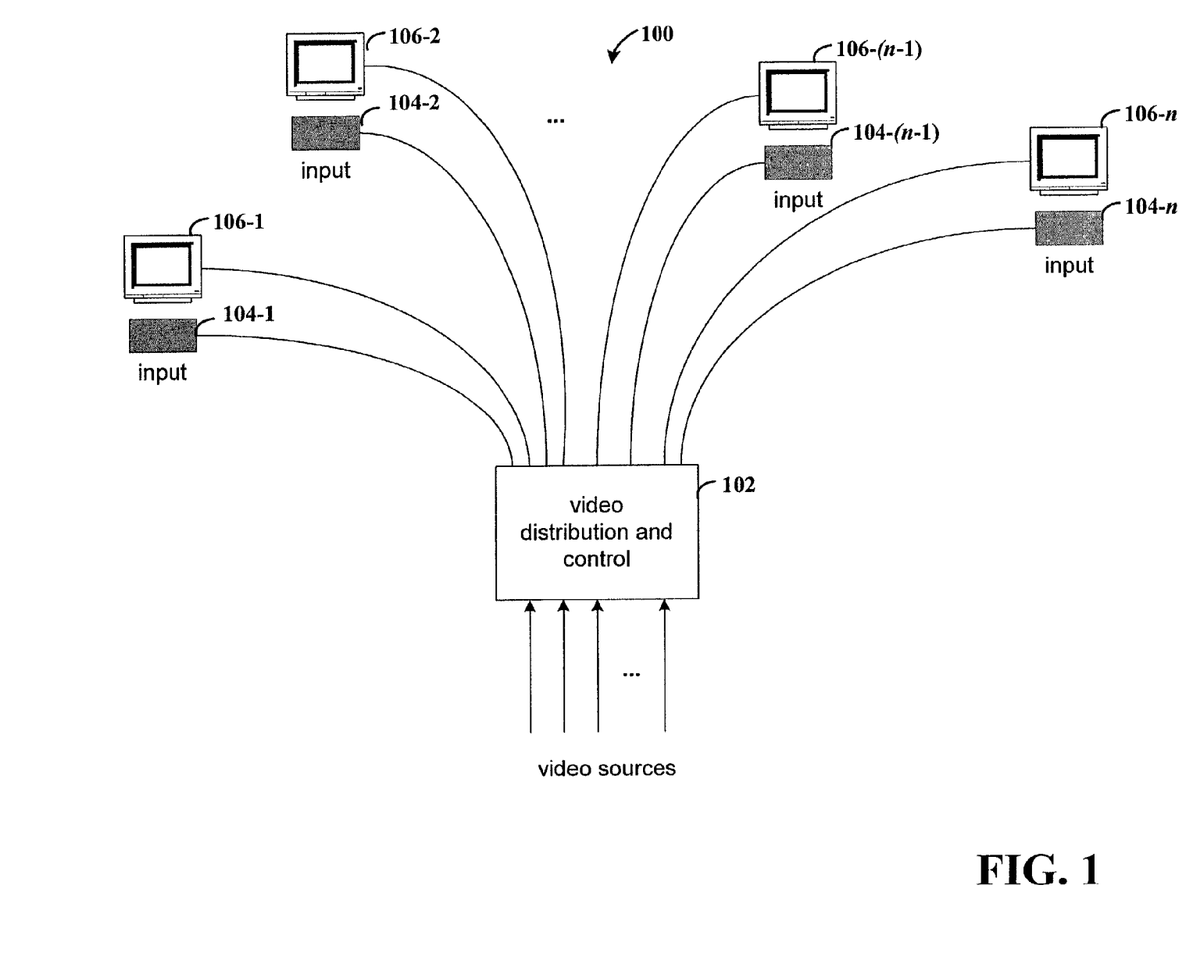
FIG. 1 is a block diagram of a video distribution system.

FIG. 1 is a block diagram of a video distribution system. System 100 receives video signals from a plurality and variety of sources. Various combinations of one or more of the video signals are then selectively routed and displayed at display terminals. System 100 includes centralized video distribution and control arrangement 102 and a plurality of terminals. Each of the terminals includes an input device (104-1-104-n) and a video display terminal (106-1-106-n), each of which is driven by a separate video signal from video distribution and control arrangement 102.

Video distribution and control arrangement 102 receives video signals from a plurality of sources, which may include video cameras that generate NTSC signals, digital video cameras that generate digital video data, or radar systems, for example. The analog video signals are digitized within distribution and control arrangement 102 for the purpose of selecting video stream(s) and combining selected video data with graphical overlay data in response to signals from one of input devices 104-1-104-n. Digital video data that is input to the distribution and control arrangement is also selectable by the terminals. Operationally, for example, there may be 10 video sources, and 4 of the video sources may be selected for display at a particular one of the display terminals 106-1-106-n. The selection of the video sources is made in response to control signals received from the input device that is associated with the particular display terminal. Video distribution and control arrangement 102 converts the selected and combined digital video data to an analog video signal (e.g., RGB) to drive a video display.

The selection of video streams for display at a display terminal is user-controlled via an associated input device. An input device may take various forms, depending on application requirements. For example, input device may be a keyboard, a mouse, trackball, voice control or other known apparatus. Alternatively, the input device could be a separate touch screen or integrated with the display terminal in the form of a touch screen. In addition, numerous software control methodologies (commands, menus, and GUIs) could be employed in supporting the selection.

The overlay of graphical data onto video data is also performed in response to user controls initiated at an input device. For example, textual data can be overlaid on video data from a radar source for coordinate and directional information.

Although display terminals 106-1-106-n are all illustrated as being of the same type, it will be appreciated that different combinations of types of video display terminals could be used. For example, various combinations of monochrome and color display terminals, as well as various gradations thereof, could be used. Thus, the respective digital-to-analog converters of video distribution and control arrangement 102 must be compatible with the type of display terminal.

Figure 2:
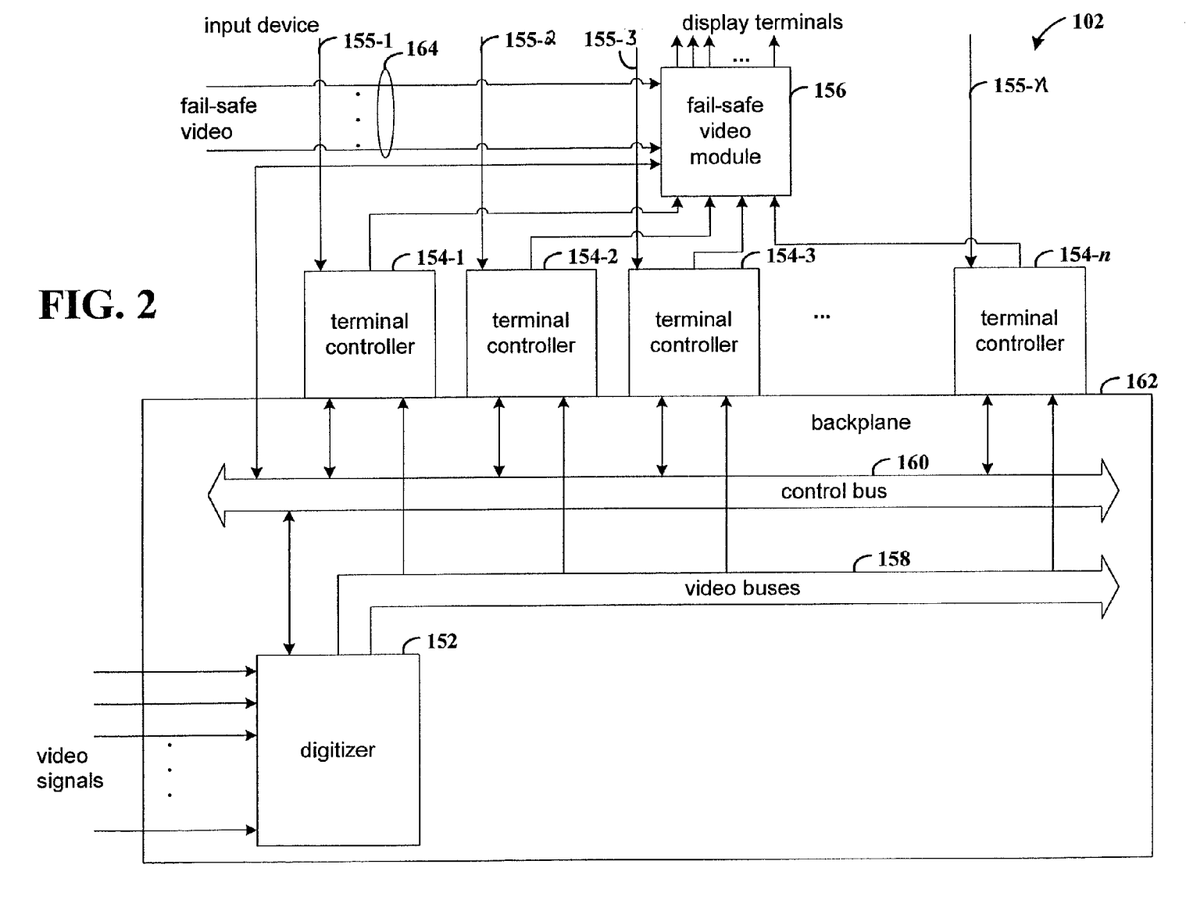
FIG. 2 is a block diagram of a video distribution and control arrangement in accordance with one embodiment of the invention.

FIG. 2 is a block diagram of a video distribution and control arrangement in accordance with one embodiment of the invention. Video distribution and control arrangement 102 receives a plurality of analog video signals, digitizes the signals into digital video streams, and selects subsets of the video streams for display on the connected video displays. In addition, graphical data generated in response to control signals from the input device are overlaid on the video data.

Video distribution and control arrangement 102 includes digitizer 152, multiple terminal controllers 154-1, 154-2, 154-3, . . . 154-n and fail-safe video module 156. Digitizer 152 includes multiple analog-to-digital converters that generate digital video data from the input video signals and drives the video data on digital video bus 158. The video data that is generated from a particular video signal is referenced herein as a "video stream". Each terminal controller 154-1-n performs the function of selecting one or more video streams for display on a connected display terminal in response to signals from a connected input device. For example, control signals are received by terminal controllers 154-1-154-n on lines 155-1-155-n. In addition, the terminal controller overlays graphics data on the video data in accordance with input signals and software executing within the controller.

Video bus 158 is comprised of a plurality of individual video buses (not shown), each dedicated to one of the video streams. Thereby, each of the terminal controllers 154-1-154-n has access to all of the video streams. In one embodiment, the individual buses include either 8 data lines and two clock lines (10-line buses) or 8 data lines and a single clock line (9-line buses). The 10-line buses may be used to carry either one color or two monochrome video streams. The data from the various sources is multiplexed on the buses to reduce the number of lines.

In an example embodiment, control bus 160 is implemented as a standard VersaModule Eurocard bus (VME bus). Control bus 160 is used to set various control registers in the modules that are connected to the bus. For example, digitizer 152 has control registers that dictate which video streams are carried on which of the video buses 158, terminal controllers 154-1-n have control registers that control which video buses are routed to display presentation processing elements (within the terminal controller) and thereafter to up to four independent display terminals, and fail-safe video module 156 has control registers that are used for selecting between fail-safe video signals and the other video signals. It will be appreciated that system-level control can be accomplished with an additional processor (not shown) that is coupled to control bus 160 for configuring the control registers of digitizer 152, terminal controllers 154-1-154-n, and fail-safe video module 156.

Video bus 158 and control bus 160 are integrated with backplane arrangement 162, which includes card slots (not shown) into which terminal controllers 154-1-154-n can be inserted. Thus, a modular system is provided in which additional display terminals 106 and accompanying input devices 104 can be added to the system with "plugable" terminal controllers and appropriate cabling. The backplane is comprised of a printed circuit board having signal lines for the control bus and video bus, components mounted on the circuit board to implement digitizer 152, and card slots for connecting terminal controllers. The card slots conform to ANSI/VITA standard 1-1994 (American National Standard for VME64), for example.

Terminal controller 154 performs the functions of selecting video streams from video bus 158 in response to user-control signals from an input device and converting the video streams from digital signals to analog signals. In addition, graphics data is overlaid on the video streams in accordance with application processing requirements.

Fail-safe video module 156 is provided to supply video signals from fail-safe sources, even if digitizer 152 or the sources supplying video signals thereto fail. For example in a security application, battery powered video cameras could be employed for scenarios where power is lost to other video sources. The particular characteristics of the fail-safe video sources are determined by the application. Module 156 provides video signals to the system display terminals 106-1-106-n, wherein the particular video signals that are output are either the video signals on lines 164 from the fail-safe video sources or the video signals from the terminal controllers 154-1-154-n. A set of relays is used to provide a specific video signal path even when the module is not energized (in the absence of power). In one embodiment, fail-safe video module 156 drives a plurality of RGB video outputs and also has a plurality of RGB inputs. Each of the video outputs has a fail-through capability, wherein video signals pass through the relays when the relays are in a de-energized state.

Figure 3:
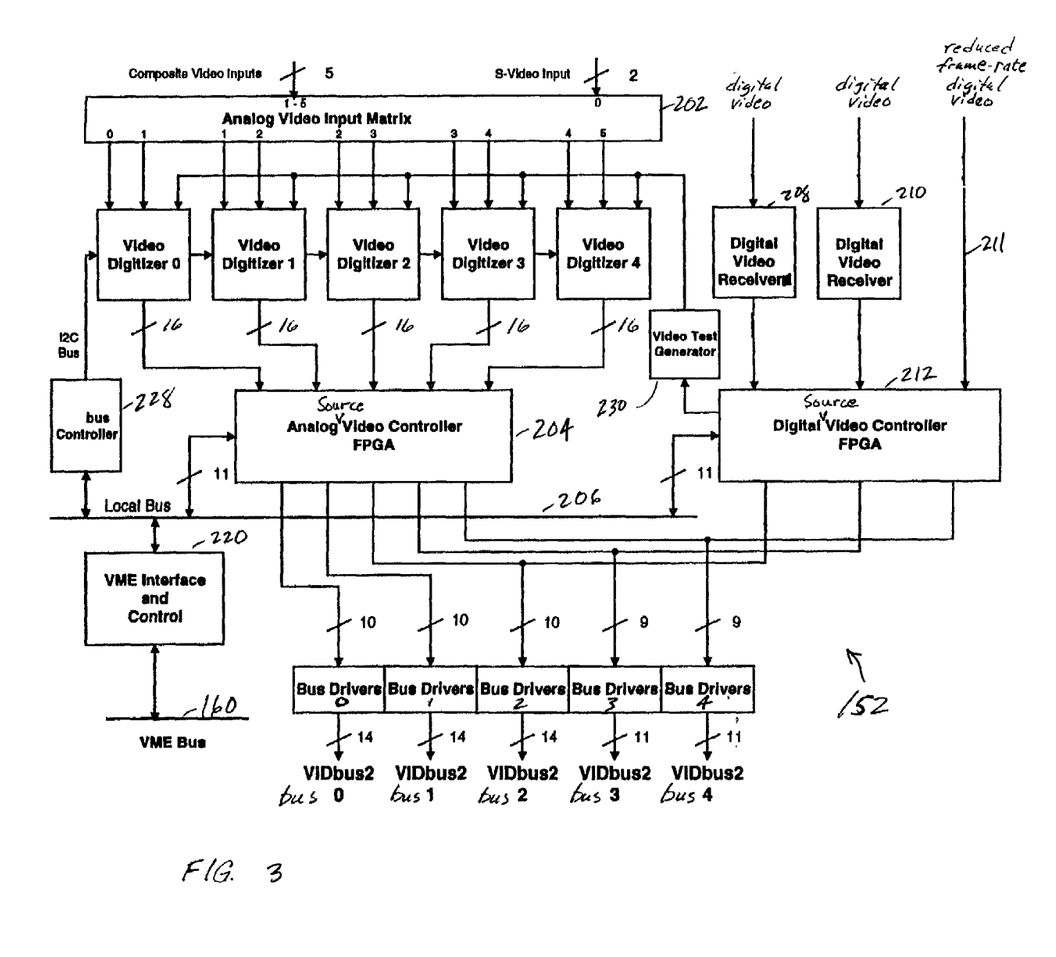
FIG. 3 is a functional block diagram of digitizer in accordance with another embodiment of the invention.

FIG. 3 is a functional block diagram of digitizer 152 in accordance with one embodiment of the invention. Digitizer 152 receives both analog and digital video signals and generates digital video streams that are driven on the video buses 158.

Video input matrix 202 has input ports for 5 NTSC composite video signals and two S-video signals. The two S-video ports can also be used for a single NTSC composite video signal and are together referenced as input port 0, and the remaining input ports are referenced as input ports 1–5. The output ports of input matrix 202 are labeled to correspond to the input port numbers. Signals on input ports 0 and 1 are routed to digitizer 0; signals on input ports 1 and 2 are routed to digitizer 1; signals on input ports 2 and 3 are routed to digitizer 2; signals on input ports 3 and 4 are routed to digitizer 3; and signals on input ports 4 and 5 are routed to digitizer 4. Input matrix 202 is implemented with a set of analog multiplexers that route the video signals as indicated.

While input matrix 202 is shown as having 5 composite video input ports and 2 S-video input ports, it will be appreciated that different combinations of various types of video input ports could be used in alternative embodiments.

Each of digitizers 0–4 convert NTSC/EIA-170 video signals to digital format, for example, 8-bit YCrCb 4:2:2 format video data. Each digitizer has four multiplexed video input ports, of which 3 ports are used. For systems having additional video sources and additional video buses 158, the fourth input port of a digitizer may be used. Each digitizer selects the video signal from one of the input ports and generates digital video data for the selected signal.

Each digitizer selects from three input video signals. Two of the input video signals are the signals provided by input matrix 202 from the various video sources, and the third video signal is from video test generator 230. It can be seen that the video signals from input ports 2-4 of matrix 202 are output to two digitizers. For example, the signal from port 1 is input to digitizers 0 and 1. This provides a level of redundancy for the signals on ports 1–4 relative to the digitizers. That is, if digitizer 0 fails, the signal from port 1 can still be digitized by digitizer 1. No redundancy is provided for ports 0 and 5.

Each of the digitizers has 16 output signal lines and converts the signal into a YCrCb digital video format. In the example embodiment, digitizers 0–4 are implemented with Brooktree BT 829 model digitizers.

Analog source video controller 204 receives input video streams from digitizers 0–4 and converts the video data to VIDbus2 format. Controller 204, in response to control signals received via local bus 206, also selectively places any of the output signals from digitizers 0–4 in various combinations on the five VIDbus2 buses 0–4, utilizing a full VIDbus for color video data or half a VIDbus for monochrome data.

Prior video distribution systems had on the order of 300 pins available for distribution of video signals. Since an RGB video signal requires 7 bits per color plus control bits, 24 bits per channel are typically required. If the user requires 6 channels, the number of pins requires increases to 144 (6 channels*24 bits). However, where cost constraints dictate the usage of generally available VME bus connectors having fewer than 100 pins and the demand for video channels is increasing, the challenge faced is that of having too few pin resources to meet the output demanded of the video distribution system. To solve this problem, the analog signals are digitized in YCrCb format and the video data multiplexed over the available channels.

The video data that is output from video controller 204 is input to bus drivers 0–4 on three 10-bit and two 9-bit channels. The 10-bit channels can be used for a single color video stream (8 data lines and two clock lines) while the 9-bit channels are used only for color video streams (8 data lines and one clock line). However, to reduce the number of lines from the bus drivers, the bus driver outputs are multiplexed via a VID Bus Multiplexer (not shown) from video buses 158.

Video data is received by analog video controller 204 from digitizers 0–4 at a clock rate that is twice the output of controller 204. At controller 204 the data is clocked at a rate of up to 33 MHz with two data words being transmitted during a single clock cycle (the first word on the rising clock edge and the second word on the falling clock edge). Using double edge clocking effectively reduces the number of lines and reduces the clock speed from video controller 204 to the MMVP (Multimode Video Processor—not shown), thereby avoiding frequency mismatch problems or glitching that may occur on backplane 162 due to the use of off the shelf components. All data lines should be stable at least 4 ns before a clock edge is measured. All data lines should also be held valid for a minimum of 0 ns after a clock edge is measured. The data is latched and demultiplexed so that is it provided on router data lines (not shown) at ½ the incoming rate (where first and second data words are available at rising clock edges). Thus the decoding of the data at the MMVP module (not shown), coupled to VID 152, is automatic by using the appropriate edge to clock the data into each half of the data register.

In an example embodiment, VID buses 0–2 consist of a 10-signal interface wherein the upper half of the 10-signal interface includes 4 data lines and an associated clock line, and the lower half is similarly arranged. The number of input pins is reduced by time multiplexing pixel data on each half of the bus using the rising and falling edges of the clock signal. Four bits comprising half of word 0 are transferred on the rising edge of the clock, and four bits comprising half of word 1 are transferred on the falling edge of the clock. Thus, each complete clock cycle produces 8 bits of data from each half of a VID bus. When both halves of a transfer are used together, a single color video stream can be transferred on a VID bus.

VID buses 3–4 are comprised of 9 signal lines: 8 data lines and 1 clock line. Thus, as compared to the 10-wide VID buses the 9-wide VID buses have a single clock signal controlling both the upper and lower halves of the 8 data lines. The tables below illustrate the color and monochrome data formats. Table 1 is the data format for a 10-wide VID bus configured for a single color video stream; and Table 2 is the data format for a 9-wide VID bus configured for a single color or monochrome video stream. Note that Table 1 includes two clock signals (C(U) and C(L)), while Table 2 includes only a single clock signal. Y0–7 are the bits that represent the intensity level of a pixel, and CrCb0–7 represent the chroma level of a pixel.

TABLE 2

(single color/single monochrome) - VIDBus Formats

| line | C(U) | Video stream A | | | | Video stream B | | | |
| --- | --- | --- | --- | --- | --- | --- | --- | --- | --- |
| | | 7 | 6 | 5 | 4 | 3 | 2 | 1 | 0 |
| word 0 | rising | CrCb3 | CrCb2 | CrCb1 | CrCb0 | Y3 | Y2 | Y1 | Y0 |
| word 1 | falling | CrCb7 | CrCb6 | CrCb5 | CrCb4 | Y7 | Y6 | Y5 | Y4 |

When configured as a color bus, the upper and lower halves of the VID bus transfers 16 bits of video data during each clock period (8 bits on the rising edge and 8 bits on the falling edge). Eight of the bits represent the intensity data for a pixel (Y0–7), and the other eight bits represent half of the pixel color data. The color data alternates on successive transfers between Cr and Cb. Thus, in transferring 32 bits of video data, two pixel intensity values are transferred, but only one complete set of color values are transferred (8 bits of Cr and 8 bits of Cb).

The multiplexed data is illustrated for both color and monochrome. In an alternative system having several buses, several buses could be designated color or single monochrome, with the primary intention of using the system for color but with the capability of transmitting in a single monochrome source, thereby saving one clock pin per bus.

Video control signals are imbedded in the pixel data so that only eight data bits are required to completely define the video signal. In an example embodiment, certain Y values in combination with CrCb values are used for frame control information. For example, predetermined Y values can be used to indicate an invalid pixel, the end of a pixel line, horizontal and vertical resets of blank and active lines etc. Table 3 illustrates the control codes that are used to define a color video signal while Table 4 illustrates the control codes that are used to define a monochrome video signal.

TABLE 3

Color Video Control Codes

| Y Value | Chroma Value | Meaning |
| --- | --- | --- |
| 0x00 | 0xFF | Invalid pixel; last valid pixel was Cb |
| | 0xFE | Invalid pixel; last valid pixel was Cr |

TABLE 1

(single color) - VIDBus Formats

| line | C(U) | Video stream A | | | | C(L) | Video stream B | | | |
| --- | --- | --- | --- | --- | --- | --- | --- | --- | --- | --- |
| | | 7 | 6 | 5 | 4 | | 3 | 2 | 1 | 0 |
| word 0 | rising | CrCb3 | CrCb2 | CrCb1 | CrCb0 | rising | Y3 | Y2 | Y1 | Y0 |
| word 1 | falling | CrCb7 | CrCb6 | CrCb5 | CrCb4 | falling | Y7 | Y6 | Y5 | Y4 |

TABLE 3-continued

Color Video Control Codes

| Y Value | Chroma Value | Meaning |
|---|---|---|
| 0x01 | 0xFF | Cb pixel; last pixel was the last active pixel of the line |
|  | 0xFE | Cr pixel; last pixel was the last active pixel of the line |
| 0x02 | 0xFF | Cb pixel; next pixel is the first active pixel of the line |
|  | 0xFE | Cr pixel; next pixel is the first active pixel of the line |
| 0x03 | 0xFF | Cb pixel; Horizontal Reset of a vertical active line |
|  | 0xFE | Cr pixel; Horizontal Reset of a vertical active line |
| 0x04 | 0xFF | Cb pixel; Horizontal Reset of a vertical blank line |
|  | 0xFE | Cr pixel; Horizontal Reset of a vertical blank line |
| 0x05 | 0xFF | Cb pixel; Vertical Reset followed by an even field |
|  | 0xFE | Cr pixel; Vertical Reset followed by an even field |
| 0x06 | 0xFF | Cb pixel; Vertical Reset followed by an odd field |
|  | 0xFE | Cr pixel; Vertical Reset followed by an odd field |
| 0x07 to 0x0F | 0xFF 0xFE | Unused codes |

TABLE 4

Monochrome Video Control Codes

| Y Value | Meaning |
|---|---|
| 0x00 | Invalid pixel |
| 0x01 | Last pixel was the last active pixel of the line |
| 0x02 | Next pixel is the first active pixel of the line |
| 0x03 | Horizontal Reset of a vertical active line |
| 0x04 | Horizontal Reset of a vertical blank line |
| 0x05 | Vertical Reset followed by an even field - large frame |
| 0x06 | Vertical Reset followed by an odd field - large frame |
| 0x07 | Vertical Reset followed by an even field - small frame* |
| 0x08 | Vertical Reset followed by an odd field - small frame* |
| 0x09 to 0x0F | Unused |
| 0x10 to 0xFF | Valid pixel |

*These codes used for digital radar video only

Each of bus drivers 0–4, implemented for example, using 74ADT2244A bus drivers from Texas Instruments, buffers output data from controller 204 and drives a respective one of buses 0–4. It will be appreciated that buses 0–4 comprise video bus 158 of FIG. 2. Buses 0–2 are each comprised of 14 signal lines, and buses 3 and 4 are each comprised of 11 signals lines. The 14 signal lines driven by a bus driver include 4 lines for accommodating in addition to the 10 data lines, triplicate drivers for clock signal integrity and accommodate the number of slots in the backplane.

Digitizer 152 also includes channels for receiving input digital video data, formatting the video data for VIDbus2, and selecting desired video data. For example, digital video receivers 208 and 210 are provided for receiving video data and converting to VIDbus2 format and are implemented using FPGAs. A third digital video input channel 211 is provided for receiving pre-formatted VIDbus2 video data. For example, reduced-frame rate video data may be input to digital source video controller 212.

Analog source video controller 204 performs the routing of signals from digitizers 0–4 to the proper one of video buses 0–4. The video streams that are output and the buses 0–4 on which the streams are driven are selected by controller 204 in response to control signals received via interface and control logic 220. As noted above, two monochrome video streams can be selectively multiplexed on one of the 10-bit lines, or one 10-bit line can be used for a color video stream in accordance with control signals received via control logic 220.

Digital source video controller 212 receives video data from the digital sources, and in response to control signals received via VME interface and control logic 220, selects from the sources data to be driven on buses 2–4. Both controllers 204 and 212 are implemented using FPGAs in the example embodiment.

Digitizer 152 is coupled to VME bus 160 via interface and control element 220. Digitizer 152 operates as an 8-bit slave on VME bus 160, and control logic 220 conforms to the standard ANSI/VITA1-1994 as implemented on an FPGA. Analog source controller 204 and digital source controller 212 receive control signals via control logic 220 that indicate which video streams are to be output on which video buses 0–4.

Bus controller 228 provides an interface between interface and control logic 220 and digitizers 0–4. Each of digitizers 0–4 has a serial input configuration port, through which configuration data can be loaded into configuration registers. The data in a configuration register dictates, which of the input video signals is selected for digitization by a digitizer.

Video test generator 230 provides test input video signals to digitizer 0–4, for example, solid, vertical stripes, horizontal stripes, and checkerboard patterns. Controller 212 is connected to test generator 230 to select which image is output and provided to digitizers 0–4.

Figure 4:
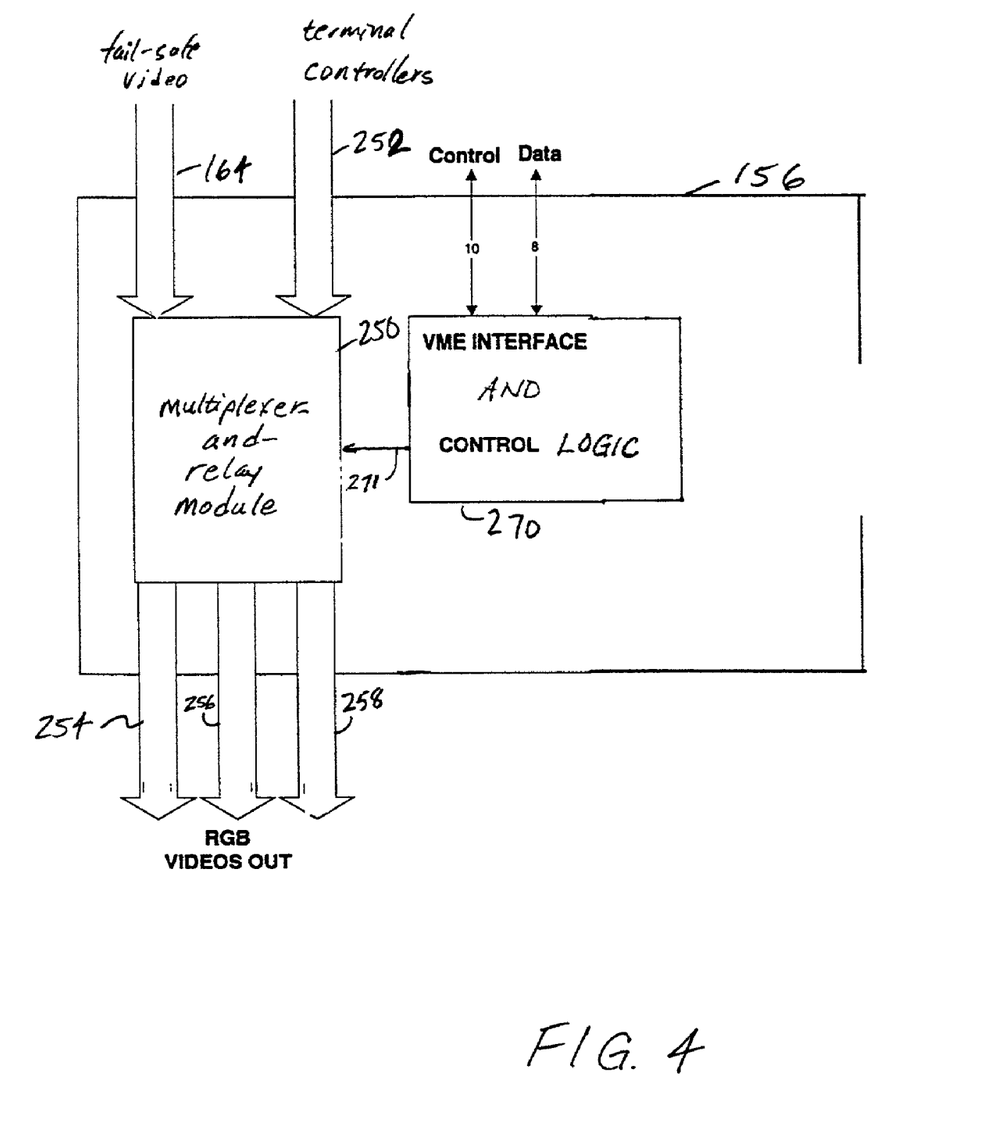
FIG. 4 is a functional block diagram of an example fail-safe video module.

FIG. 4 is a functional block diagram of a fail-safe video module in accordance with one embodiment of the invention. Fail-safe video module 156 independently selects either the output video signal from terminal controllers 154-1-154-n or a video signal from one of a plurality of fail-safe video sources and provides as output RGB video signals to a plurality of display terminals. A set of relays is used to pass video signals, even when the module is not energized.

Figure 5:
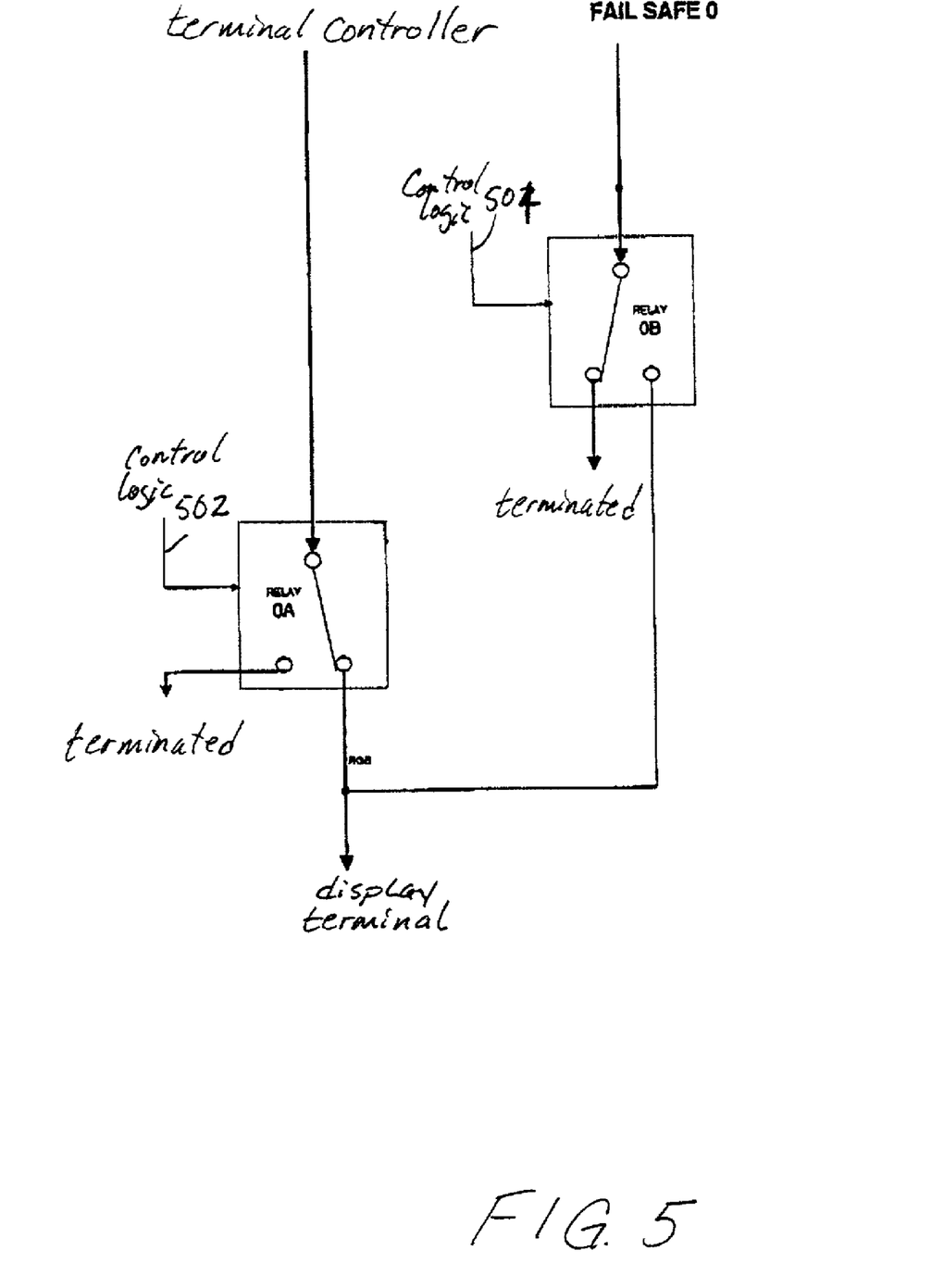
FIG. 5 is a circuit schematic for one color (e.g., of RGB) of station 0 of a multiplexer-and-relay module which is in an energized state.
Figure 6A:
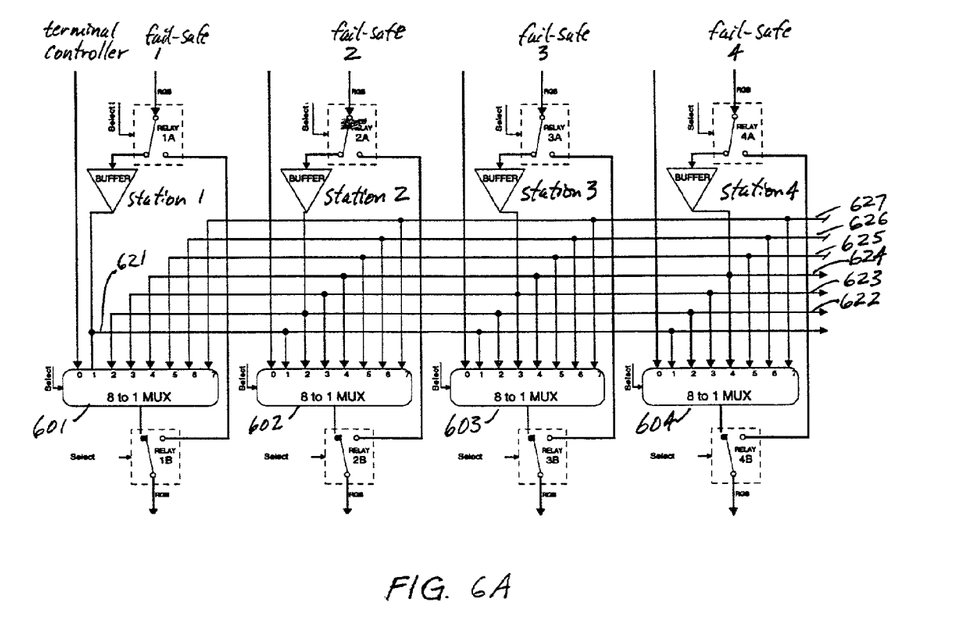
FIGS. 6A and 6B are circuit schematics for one color (of RGB) of stations 1–8 of an example multiplexer-and-relay module having 9 stations and which is in an energized state.
Figure 6B:
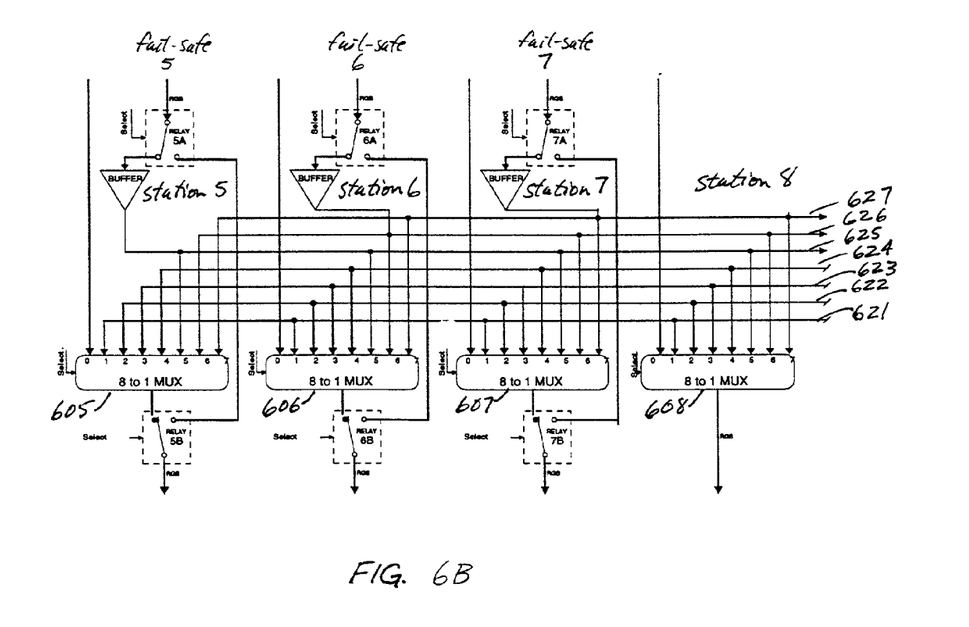

The fail-safe video signals are input to multiplexer-and-relay module 250 on line 164 (referenced as fail-safe signals 0-m), and the video signals from the terminal controllers are input to module 250 on line 252. The output video signal on line 254 is referred to as the output of station 0 of module 250. The station 0 output signal is either fail-safe signal 0 or in the video signal from terminal controller 0 (154-1 in FIG. 2). The output video signal on line 256 is from a last one of the multiplexers of module 250 and is either one of fail-safe signals 1-m or the video signal from one of the terminal controllers. A group of output video signals is illustrated by line 258. The signals on line 258 are the output video signals of stations 1 (m-1) of the multiplexer and relay module 250. FIGS. 5, 6, and 7 further illustrate the stations implemented in the multiplexer and relay module 250.

The multiplexers and relays (not shown) of module 250 are controlled via line 271 by signals from VME interface and control logic element 270, which is coupled to VME control bus 160. A processor (not shown) connected to control bus 160 in accordance with application-specific programming, addresses fail-safe module 156 and writes control words to registers (not shown) within logic element 270. The control words in the control registers (one control register per station) controls the selection signals of line 271. In the example embodiment, logic element 270 is implemented with an FPGA.

FIG. 5 is a circuit schematic for one color (e.g., of RGB) of station 0 of multiplexer-and-relay module 250, which is in an energized state. While not shown, it will be appreciated that station 0 includes comparable circuitry for the other two colors. Station 0 passes either the video signal from a terminal controller (e.g., 154-1) or the video signal from fail-safe video source 0 (not shown).

Relay 0A receives the video signal from the terminal controller, and relay 0B receives the video signal from the fail-safe source. When the multiplexer-and-relay module is in an energized state, relay 0A passes the video signal from the terminal controller to the connected display terminal, and relay 0B passes the input video signal to a terminated connection (e.g., a 75 ohm termination). When module 250 is in a non-energized state, relay 0A passes the video signal from the terminal controller to a terminated connection, and relay 0B passes the fail-safe signal to the display terminal.

Select signals are provided on lines 502 and 504 from control logic element 270 to relays 0A and 0B to select to which terminals of the relays the input video signal is routed when the relays are in energized and non-energized states. In accordance with one example embodiment, the relays are implemented using ER134M4-5A relays from Teledyne, Inc.

FIGS. 6A and 6B are circuit schematics for one color (of RGB) of stations 1–8 of an example multiplexer-and-relay module 250 having 9 stations and which is in an energized state. It will be appreciated that comparable circuitry (not shown) is implemented for each of the other two colors. While 9 stations are illustrated (station 0 in FIG. 5 and stations 1–8 in FIGS. 6A and 6B), it will be appreciated that various other station configurations can be implemented depending upon the number of terminal controllers and number of fail-safe video sources. When multiplexer-and-relay module 250 is in an energized state, stations 1–7 output either a respective one of the video signals from the connected terminal controllers or a selected one of the video signals from fail-safe sources 1–7. When multiplexer-and-relay module 250 is in an non-energized state, stations 1–7 output a respective one of the video signals from a connected one of the fail-safe sources. Station 8 outputs the video signal from a selected one of the fail-safe sources 1–7 only when multiplexer-and-relay module 250 is in an energized state.

Stations 1–7 each include respective multiplexers 601–607. Each of the multiplexers receives a video signal from a respective terminal controller along with the video signals from 7 fail-safe sources. Dedicated selection signals are provided to each of the multiplexers for independent selection of a video signal. For example, the video signal from the terminal controller connected to station 1 can be selected at station 1, and the video signal from fail-safe source 1 can be selected at station 7. The selection signals are driven by control section 270 of multiplexer-and-relay module 250, which is controlled by an external processor via control bus 160.

Stations 1–7 also include a pair of respective relays 1A–7A and 1B–7B. Each "A" relay is connected to receive a video signal from one of the fail-safe sources 1–7. For example, relay 2A receives the video signal from fail-safe source 2. When in an energized state, the "A" relays pass the input video signals to the multiplexers of stations 1–7, as selected by the select signal input to the relays. For example, the video signal from fail-safe source 1 is output from relay 1A, buffered, and routed on signal line 621 to multiplexers 601-608. Similarly, video signals from fail-safe sources 2–7 are provided by relays 2A–7A and carried on lines 622–627 to multiplexers 601–608. When the "A" relays are in a non-energized state, the video signals are passed to the associated "B" relays instead of the multiplexers.

Each "B" relay has two input ports: one connected to the output of a respective one of the multiplexers 1–7, and the other connected to an output port of an "A" relay which passes the input video signal when the "A" relay is in a non-energized state. For example, relay 2B is coupled to the output port of multiplexer 602 and to one of the output ports of relay 2A. When multiplexer-and-relay module 250 is in an energized state, relay 2B passes the video signal selected at multiplexer 602, and when the multiplexer-and-relay module is in a non-energized state, relay 2B passes the video signal passed by relay 2A.

Station 8 includes multiplexer 608, but has no associated fail-safe video source. Multiplexer 608 receives input video signals from a terminal controller at port 0 and video signals from the fail-safe sources 1–7 on ports 1–7. The output of station 8 can be used, for example, as input to a frame-grabber.

The present invention is believed to be applicable to a variety of applications involving distribution of video signals. Other aspects and embodiments of the present invention beyond those specifically described herein will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. An integrated video distribution system for distributing video signals from a plurality of sources, comprising:
    a control bus;
    a video digitizer arrangement coupled to the control bus and having a plurality of analog video input ports and a plurality of digital video output ports, the digitizer arrangement configured and arranged to convert analog video signals to digital video data in YCrCb format at a first clock rate, each output port coupled to a respective first set of signal lines, wherein the video digitizer arrangement is arranged to input a plurality of analog video signals from a first plurality of video sources, respectively;
    a video data multiplexer arrangement having input ports coupled to output ports of the video digitizer arrangement, the multiplexer arrangement having a plurality of output ports, each coupled to a respective second set of signal lines, the multiplexer configured and arranged to multiplex the digital video data at a second clock rate that is less than the first clock rate, wherein a number of signal lines in each first set is greater than a number of signal lines in each second set;

a digital video bus having a plurality of video channels coupled to respective output ports of the multiplexer, wherein each channel carries a stream of video data; and a plurality of terminal controllers responsive to an input signal coupled to the video bus and to the control bus, each terminal controller having a data input port and a video output port and configured and arranged to select one or more of the streams of video data for output; and a fail-safe video subsystem having a plurality of video signal input ports and a plurality of output ports, wherein selected ones of the input ports are coupled to output ports of the terminal controllers, and others of the input ports are arranged to input fail-safe analog video signals from a plurality of alternative video sources, respectively, wherein the alternative video sources are not in the first plurality of video sources, and the fail-safe video subsystem is configured and arranged to provide on the output ports video signals from the alternative video sources in absence of power to the fail-safe video subsystem.

2. The system of claim 1, wherein the control signal is received at the terminal controller via the input port.

3. The system of claim 1, further comprising a backplane arrangement including the video bus and the control bus and having a plurality of expansion slots for connecting to the terminal controllers, each slot having pins coupled to the video bus and to the control bus.

4. The system of claim 1, wherein the fail-safe video subsystem is comprised of a plurality of stations, wherein selected ones of the stations include:

a first relay having first and second output terminals and an input terminal arranged to be coupled to an associated one of the alternative video sources, wherein the first relay connects the input terminal to the first output terminal when in an energized state and connects the input terminal to the second output terminal when in a non-energized state;

a multiplexer having an output port, a first input port coupled to an associated one of the terminal controllers, and a second input port coupled to the first output terminal of the first relay; and a second relay having a first input terminal coupled to the output port of the multiplexer, a second input terminal coupled to the second output terminal of the first relay, and an output terminal coupled to an output port of the fail-safe video subsystem, wherein the second relay connects the first input terminal to the output terminal when in an energized state and connects the second input terminal to the output terminal when in a non-energized state.

5. The system of claim 1, wherein the digitizer arrangement further comprises:

a plurality of digitizers coupled to the analog video input ports;

a plurality of digital video receivers having input ports arranged to receive input digital video signals, respectively; and a video bus controller arrangement having data input ports coupled to the digitizers and to the video receivers, the video bus controller configured and arranged to multiplex the video signals over the video channels of the video bus.

6. The system of claim 5, wherein the video bus controller arrangement is implemented with one or more field programmable gate arrays (FPGAs).

7. The system of claim 6, further comprising:

a first FPGA having input ports coupled to output ports of the digitizers, the first FPGA configured and arranged to multiplex digitized video signals generated from video signals from the analog video input ports over the video channels of the video bus; and a second field programmable gate array having input ports coupled to output ports of the video receivers, the second FPGA configured and arranged to multiplex the input digital video signals over the video channels of the video bus.

8. The system of claim 5, wherein the video channels are comprised of a first set and a second set of video channels, each channel of the first set having a number of signal lines sufficient for parallel transmission of multiple streams of monochrome video data, and each channel of the second set having a number of signal lines sufficient for transmission of a single stream of color video data.

9. The system of claim 1, further comprising:

a plurality of display terminals coupled to the terminal controllers, respectively; and a plurality of input devices coupled to the terminal controllers, respectively, the input devices arranged for input of control signals to the terminal controllers to select certain ones of the video signals for display at the display terminals.

10. The system of claim 9, wherein the input device is a point-and-click device.

11. The system of claim 9, wherein the input device includes a touchscreen.

12. The system of claim 1, wherein the digitizer arrangement further comprises:

a plurality of digitizers coupled to the analog video input ports;

a plurality of digital video receivers having input ports arranged to receive input digital video signals, respectively; and a video bus controller arrangement having data input ports coupled to the digitizers and to the video receivers, the video bus controller configured and arranged to multiplex the video signals over the video channels of the video bus.

13. The system of claim 12, wherein the video bus controller arrangement is implemented with one or more field programmable gate arrays (FPGAs).

14. The system of claim 13, further comprising:

a first FPGA having input ports coupled to output ports of the digitizers, the first FPGA configured and arranged to multiplex digitized video signals generated from video signals from the analog video input ports over the video channels of the video bus; and a second field programmable gate array having input ports coupled to output ports of the video receivers, the second FPGA configured and arranged to multiplex the input digital video signals over the video channels of the video bus.

15. The system of claim 13, wherein the video channels are comprised of a first set and a second set of video channels, each channel of the first set having a number of signal lines sufficient for parallel transmission of multiple streams of monochrome video data, and each channel of the second set having a number of signal lines sufficient for transmission of a single stream of color video data.

16. The system of claim 1, further comprising:
a plurality of display terminals coupled to the terminal controllers, respectively; and
a plurality of input devices coupled to the terminal controllers, respectively, the input devices arranged for input of control signals to the terminal controllers to select certain ones of the video signals for display at the display terminals.

17. The system of claim 16, wherein the input device is a point-and-click device.

18. The system of claim 17, wherein the input device includes a touchscreen.

19. The system of claim 1, wherein the second clock rate is half of the first clock rate.

20. The system of claim 19, wherein the video data multiplexer arrangement generates data that defines a color pixel, each pixel defined by at least four words of data and a color video control code.

21. The system of claim 20, wherein a first data word and a third data word of the four data words are transmitted on a rising clock edge and a second data word and a fourth data word are transmitted on a falling clock edge at the second clock rate.

22. The system of claim 21, wherein the first and second data words define chroma red data, the third and fourth data words define chroma blue data, and all four data words define luma data for the color pixel.

23. The system of claim 22, wherein the data words are clocked at a frequency of 33 MHz.

24. The system of claim 19, wherein the video data multiplexer arrangement generates data that defines a monochrome pixel, each pixel defined by a set of data words and a monochrome video control code.

25. The system of claim 24, wherein a first data word is transmitted on a rising clock edge and a second data word is transmitted on a falling clock edge at the second clock rate.

26. An integrated video distribution arrangement for distributing video signals from a plurality of sources, the arrangement comprising:
means for inputting a plurality of analog video signals from a respective plurality of video sources;
means for digitizing the plurality of analog video signals to respective streams of digital video data in YCrCb format at a first clock rate and outputting the digital video data on a first plurality of sets of signal lines;
means for multiplexing the digital video data at a second clock rate and outputting the digital video data on a second plurality of sets of signal lines, wherein the second clock rate is less than the first clock rate and a number of signal lines in each set of the first plurality is greater than a number of signals in each set of the second plurality;
means for selecting one or more of the streams of video data responsive to an input control signal and converting the selected one or more streams of video data to a first output analog video signal for output to a single one of a plurality of display terminals;
means for inputting a fail-safe analog video signal from a source not in the plurality of video sources;
means responsive to presence of power for relaying the first output analog video signal for output; and
means responsive to absence of power for relaying the fail-safe analog video signal for output.

27. An integrated video distribution system for distributing video signals from a plurality of sources, comprising:
a video digitizer arrangement arranged to receive a plurality of analog video signals from a plurality of sources, the digitizer arrangement configured to convert the analog video signals to respective digital video streams;
a video data multiplexer arrangement coupled to the digitizer arrangement, the multiplexer configured to time multiplex the digital video streams on a plurality of output ports;
a digital video bus having a plurality of video channels coupled to respective output ports of the multiplexer arrangement;
a plurality of terminal controllers coupled to the video bus and to the control bus, each terminal controller configured to select one or more of the streams of video data for output to a display terminal responsive to an input signal; and
a fail-safe relay circuit coupled to at least one of the terminal controllers and arranged to receive at least one fail-safe analog video signal associated with the at least one of the terminal controllers, the fail-safe relay circuit arranged to relay the fail-safe analog video signal in response to absence of power at the relay circuit and relay video data output from the at least one terminal controller responsive to presence of power at the relay circuit.

28. The system of claim 27, wherein the fail-safe relay circuit comprises:
a first relay having a first terminated output terminal, a second output terminal, and an input terminal arranged to receive the fail-safe analog video signal, wherein the first relay connects the input terminal to the first output terminal in the presence of power and connects the input terminal to the second output terminal in the absence of power; and
a second relay having an input terminal coupled to at least one terminal controller, a first terminated output terminal, and a second output terminal, wherein the second relay connects the input terminal to the first output terminal in the presence of power and connects the input terminal to the second output terminal in the absence of power.

29. The system of claim 27, further comprising:
a plurality of display terminals coupled to the terminal controllers, respectively; and
a plurality of input devices coupled to the terminal controllers, respectively, each input device arranged for input of control signals to the respective terminal controller for selection of the one or more streams of video data for display at the display terminal.

30. The system of claim 29, further comprising:
means for receiving a plurality of fail-safe video signals from a plurality of fail-safe video sources;
means, coupled to the terminal controllers and responsive to the presence of power, for selecting for output any one of the plurality of fail-safe video signals at any of the display terminals; and
means, coupled to the terminal controllers and responsive to absence of power, for relaying each of the plurality of fail-safe video signals to a respective one of the display terminals.

* * * * *